United States Patent [19]
Kaneda et al.

[11] Patent Number: 5,358,081
[45] Date of Patent: Oct. 25, 1994

[54] HYDRAULIC RETARDER CONTROL SYSTEM

[75] Inventors: Naoki Kaneda; Hideyuki Fujinami, both of Saitama, Japan

[73] Assignee: Akebono Brake Industry Co., Ltd., Tokyo, Japan

[21] Appl. No.: 77,773

[22] Filed: Jun. 18, 1993

[30] Foreign Application Priority Data

Jun. 22, 1992 [JP] Japan .................. 4-185759

[51] Int. Cl.$^5$ .............................................. B60T 1/08
[52] U.S. Cl. .................................. 188/291; 192/4 B
[58] Field of Search ............... 188/290, 291, 294, 296; 192/4 B, 12 A; 74/887

[56] References Cited

U.S. PATENT DOCUMENTS

| | | | |
|---|---|---|---|
| 3,749,209 | 7/1973 | Weinrich et al. | 188/291 |
| 3,777,860 | 12/1973 | Forster et al. | 188/291 |
| 4,235,320 | 11/1980 | Polak et al. | 192/4 B |
| 4,262,781 | 4/1981 | Schneider . | |
| 4,272,131 | 6/1981 | Termont | 188/290 X |
| 4,324,387 | 4/1982 | Steinhagen | 188/296 X |
| 4,432,442 | 2/1984 | Vogelsang | 188/290 |
| 4,711,328 | 12/1987 | Bazilio et al. . | |
| 4,881,625 | 11/1989 | Redelman | 188/290 |

Primary Examiner—Robert J. Oberleitner
Assistant Examiner—Kevin D. Rutherford
Attorney, Agent, or Firm—Finnegan, Henderson, Farabow, Garrett & Dunner

[57] ABSTRACT

The hydraulic retarder control system comprises pressure reducing valves which can switch the pressure of the air to be supplied from a pressure air source 4 to an air/liquid conversion device 25 at least to a low pressure, an intermediate pressure and a high pressure, or a proportional electromagnetic valve 110 which can reduce and adjust the pressure of the air in a stageless manner, and running speed detect devices 100, 111 which detect the fact that the running speed of a vehicle is equal to or slower than a given running speed. When there is given a detect signal by the running speed detect devices 100, 111, then the pressure reducing valves 32, 95 or the proportional electromagnetic valve 110 are or is switched over to a pressure higher than a set pressure for running speeds exceeding the given running speed, so that the high pressure air from the pressure air source 4 can be supplied to the air/liquid conversion device 25.

3 Claims, 7 Drawing Sheets

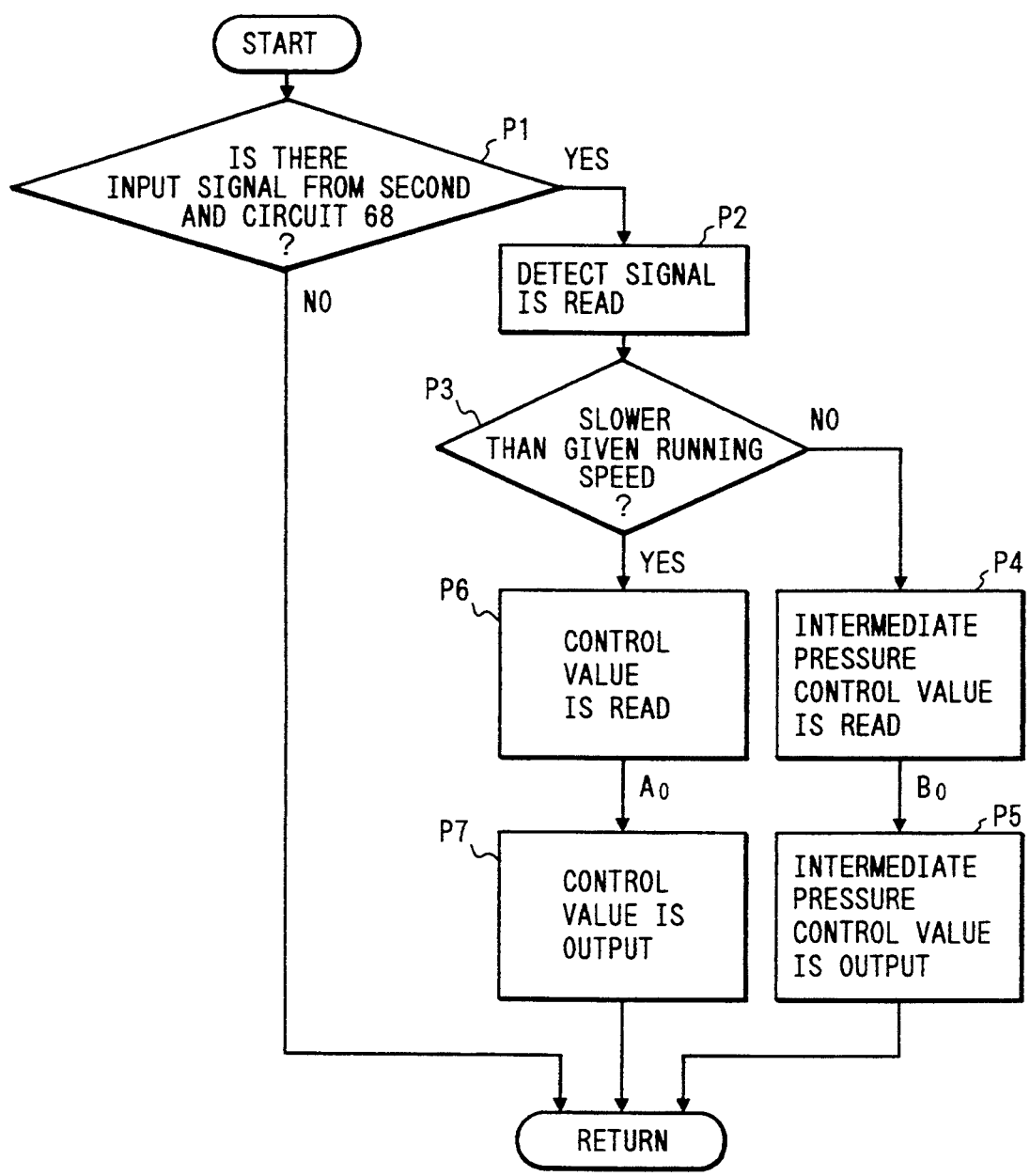

HYDRAULIC RETARDER CONTROL SYSTEM

BACKGROUND OF THE INVENTION

The present invention relates generally to a hydraulic retarder control system.

In the field of large-sized vehicles such as trucks, buses and the like, as disclosed in U.S. Pat. Nos. 4,262,781 and 4,711,328, there is known a vehicle which includes a hydraulic retarder system. The hydraulic retarder system, when the vehicle runs down along the downward path, generates a braking torque to thereby reduce the high speed of the vehicle and prevent a friction brake device from fading due to the rise in temperature, so as to improve the safety of the vehicle and the durability of friction members. The hydraulic retarder system includes a rotor fixable to a rotary shaft such as a propeller shaft or the like which is rotated together with a wheel, and a stator fixed to the body of the vehicle in such a manner that it is not rotatable. In the hydraulic retarder system, the rotor is connected and fixed to the rotary shaft by a clutch device, operation liquid is stirred by the rotor, and there is generated a brake torque due to the friction loss of the operation liquid and also due to the loss of collision with the stator.

However, since the brake torque to be produced by the hydraulic retarder system, when the pressure of the operation liquid within the hydraulic retarder is constant, is obtained according to the number of revolutions of the rotary shaft, that is, the running speed of the vehicle and thus the brake torque obtainable in the low speed running state of the vehicle is small, there is a possibility that a driver unfamiliar with the hydraulic retarder system can drive his or her car to ram a car ahead when the driver is going to stop the vehicle or when driving at the low running speed. Also, when the driver continues to run the vehicle at the low speeds of 30 to 50 Km/h in a long downward slope such as a hill road, the speed reduction obtained by the hydraulic retarder is small, resulting in an inferior operation feeling.

SUMMARY OF THE INVENTION

The present invention aims at eliminating the technical problems found in the above-mentioned conventional hydraulic retarder system. Accordingly, an object of the invention is to provide a hydraulic retarder system capable of obtaining a large brake torque even in a low speed running state of a vehicle.

Another object of the invention is to provide a hydraulic retarder system capable of obtaining a large speed reduction when a vehicle is running at low speeds in a long downward slope such as a hill road, and resulting in a good operation feeling.

The above and other objects can be achieved by a provision of a hydraulic retarder system which, according to the present invention, comprises a hydraulic retarder which is mounted on a rotary shaft rotating together with a wheel, is always filled up with operation liquid and includes a rotor and an unrotatable stator; a clutch device which is driven by a drive device and connects or disconnects the rotor with rotary shaft; a closed circuit which connects the inlet of the operation liquid of the hydraulic retarder with the outlet of the hydraulic retarder; an air/liquid conversion device which applies an air pressure to the operation liquid in the closed circuit; pressure reducing means which can switch the pressure of the air to be supplied from a pressure air source to the air/liquid conversion device; and running speed detect means which detects the fact that a vehicle is running at running speeds equal to or slower than a given running speed. According to the present hydraulic retarder device, when there is given a detect signal by the running speed detect means, the pressure reducing means is switched over to a condition in which the pressure thereof is higher than a set pressure at the running speeds greater than the given running speed, and the high pressure air from the pressure air source is supplied to the air/liquid conversion device.

According to an embodiment of the invention, the pressure reducing means can be composed of a first pressure reducing valve for reducing the pressure of the air to be supplied from the pressure air source to the air/liquid conversion device to a low pressure, a second pressure reducing valve for reducing the air pressure to an intermediate pressure, a low speed pressure reducing valve for reducing the air pressure to a high pressure, and a switch valve having a low pressure position, an intermediate pressure position and a high pressure position respectively used to switch the pressure of the air to be supplied to the air/liquid conversion device through the first pressure reducing valve, second pressure reducing valve and low speed pressure reducing valve. And, when there is given a detect signal by the running speed detect means while the switch valve is taking the intermediate pressure position, then the switch valve is switched into the high pressure position to thereby supply the high pressure air from the pressure air source to the air/liquid conversion device.

Also, according to another embodiment of the invention, the pressure reducing means can be composed of a proportional electromagnetic valve capable of controlling or reducing the pressure of the air to be supplied from the pressure air source to the air/liquid conversion device in a stageless manner. That is, in this embodiment, when it is detected by the running speed detect means that a vehicle is running at speeds equal to or slower than the given running speed, then the proportional electromagnetic valve is controlled on the basis of a control value to be set in accordance with the detect signal given by the running speed detect means to thereby increase gradually the pressure of the air to be supplied to the air/liquid conversion device as the running speed of the vehicle slows down.

According to the invention, if the clutch device is connected by the drive device while the vehicle is running, then the rotor starts to rotate integrally with the rotary shaft and the hydraulic retarder is put into operation. And, the pressure of the air from the pressure air source is reduced by the pressure reducing means and is then guided into the air/liquid conversion device and the air having a predetermined pressure is applied to the operation liquid in the closed circuit, thereby generating a brake torque corresponding to the control pressure. That is, in a circulation environment in which the self-pumping operation of the rotor allows the operation liquid, which serves also as a cooling element, to flow in from the inlet of the operation liquid and flow out from the outlet of the operation liquid, the operation liquid, which is given kinetic energy as it is stirred by the rotor, collides with the stator to thereby convert the kinetic energy of the operation liquid into thermal energy so as to produced a braking action.

In this manner, when the vehicle reduces its speed down to a running speed equal to or slower than a given running speed and a detect signal is given by the running speed detect means, the pressure reducing means is switched over to a condition whose pressure is higher than a set pressure at running speeds exceeding the given running speed. Consequently, the high pressure air from the pressure air source is then supplied to the air/liquid conversion device. As a result of this, at the running speeds equal to or slower than the given running speed, the shortage of the brake torque by the hydraulic retarder can be made up for, so that there can be obtained a proper speed reduction.

Now, according to another aspect of a hydraulic retarder control system of the invention, when, while a switch valve having a low pressure position, an intermediate pressure position or a high pressure position is in the intermediate position, a vehicle slows down to a running speed equal to or slower than a given running speed, and a detect signal is given by the running speed detect means, the switch valve is switched into its high pressure position. This causes the high pressure air from the pressure air source to be supplied to the air/liquid conversion device. As a result of this, at the running speeds of the vehicle equal to or slower than the given running speed, the shortage of the brake torque by the hydraulic retarder can be made up for, so that there can be provided a proper speed reduction.

Also, according to a still another aspect of a hydraulic retarder control system of the invention, when a detect signal is given by the running speed detect means, then there is set a control value corresponding to the detect signal given by the running speed detect means. And, the proportional electromagnetic valve is controlled on the basis of the control value and the pressure of the air to be supplied to the air/liquid conversion device is gradually increased to a high pressure as the running speed of the vehicle slackens. That is, the pressure control by the proportional electromagnetic valve is carried out in succession on the basis of the control values corresponding to the detect signals given by the running speed detect means, so that the pressure of the air to be supplied to the air/liquid conversion device is gradually varied to a high pressure as the running speed of the vehicle slows down. As a result of this, at running speeds equal to or slower than the given running speed, the shortage of the brake torque by the hydraulic retarder can be made up for to thereby provide a proper speed reduction.

BRIEF DESCRIPTION OF THE DRAWINGS

FIG. 7 is a flow chart of the operation of the second embodiment; and,

DESCRIPTION OF THE PREFERRED EMBODIMENTS

Description will be given below of the embodiments of a hydraulic retarder control system according to the invention with reference to the accompanying drawings.

Figure 1:
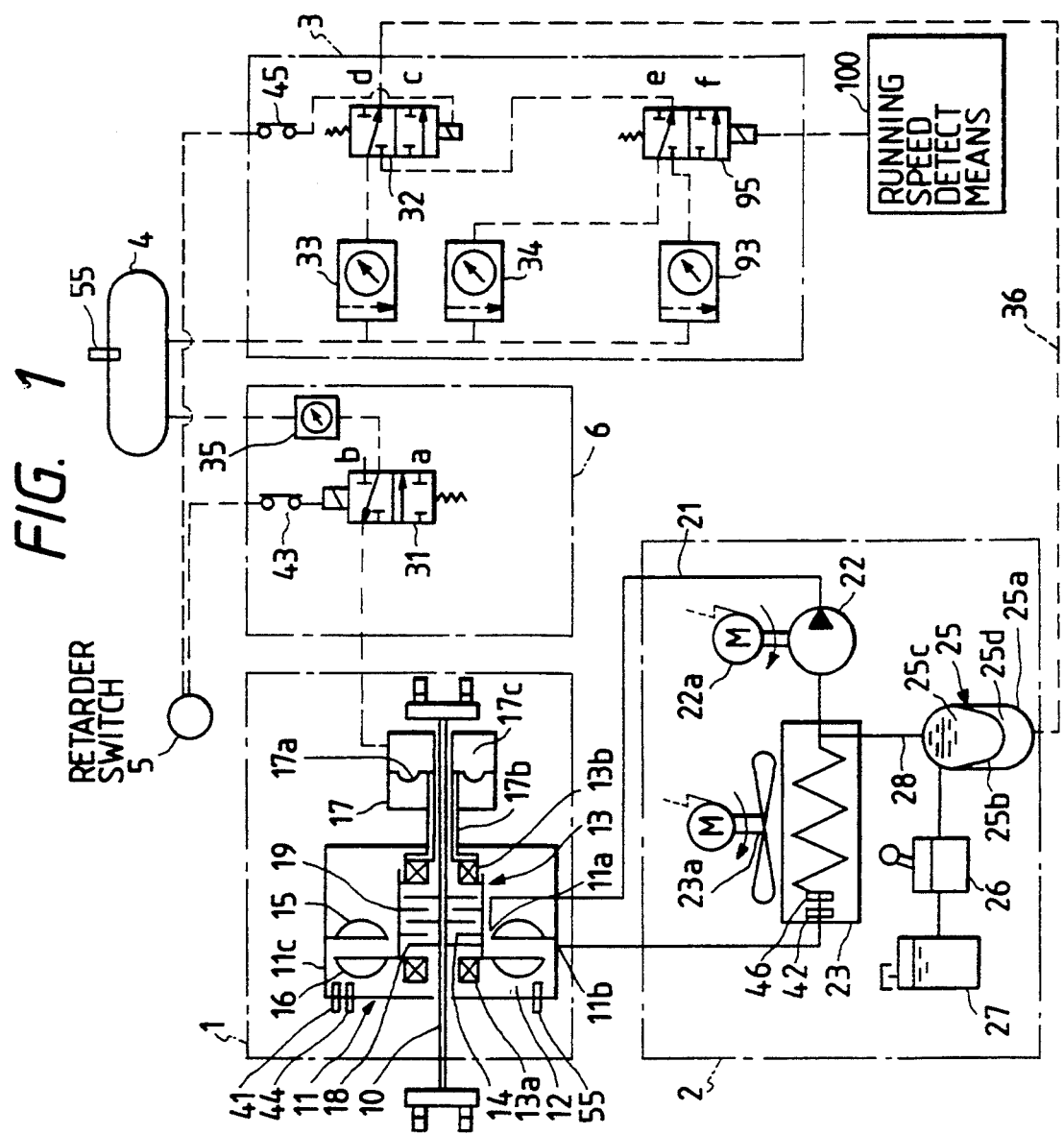
FIG. 1 is a schematic view of a first embodiment of a hydraulic retarder control system according to the invention.
Figure 2:
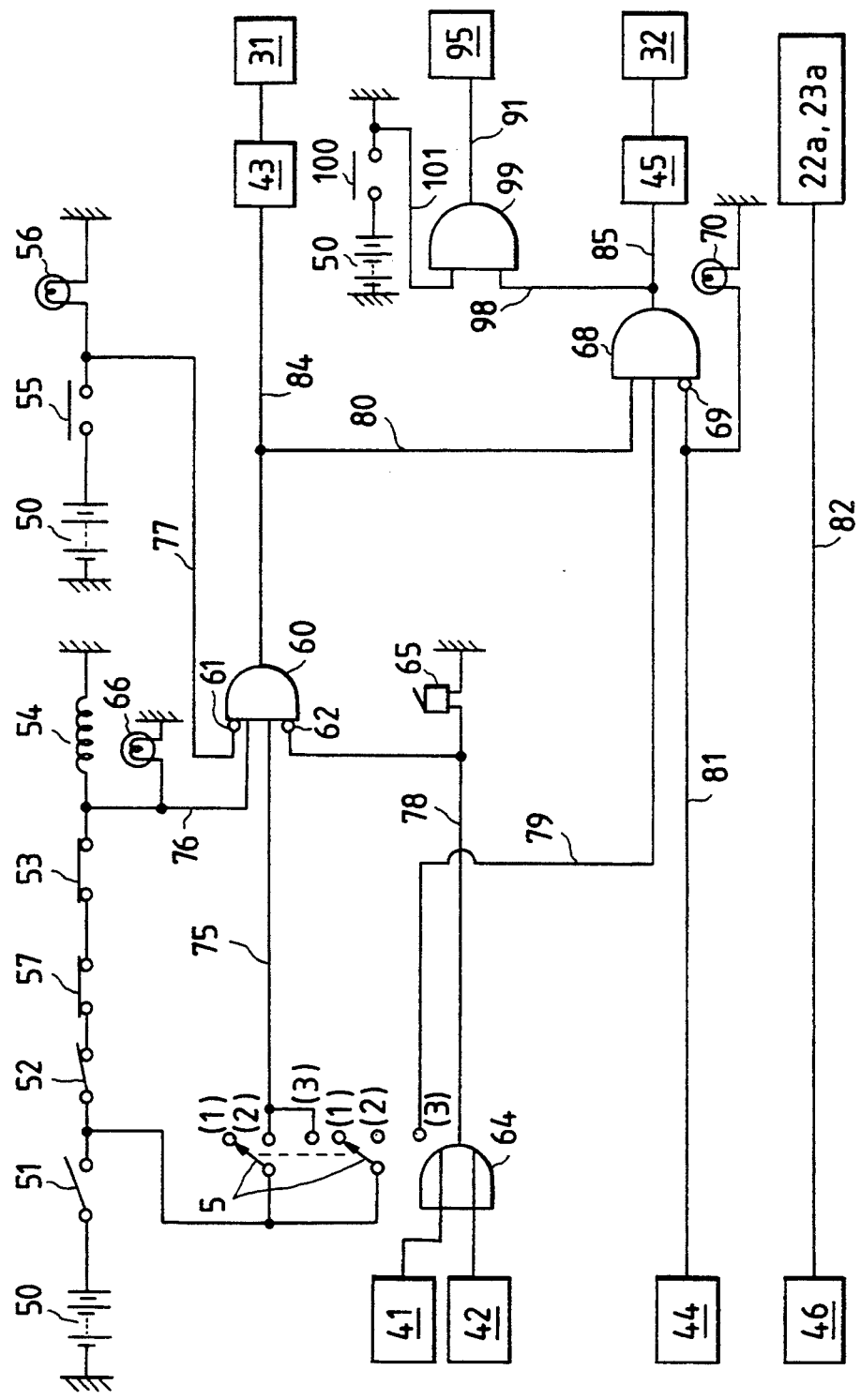
FIG. 2 is a circuit diagram of the above hydraulic retarder control system.
Figure 3:
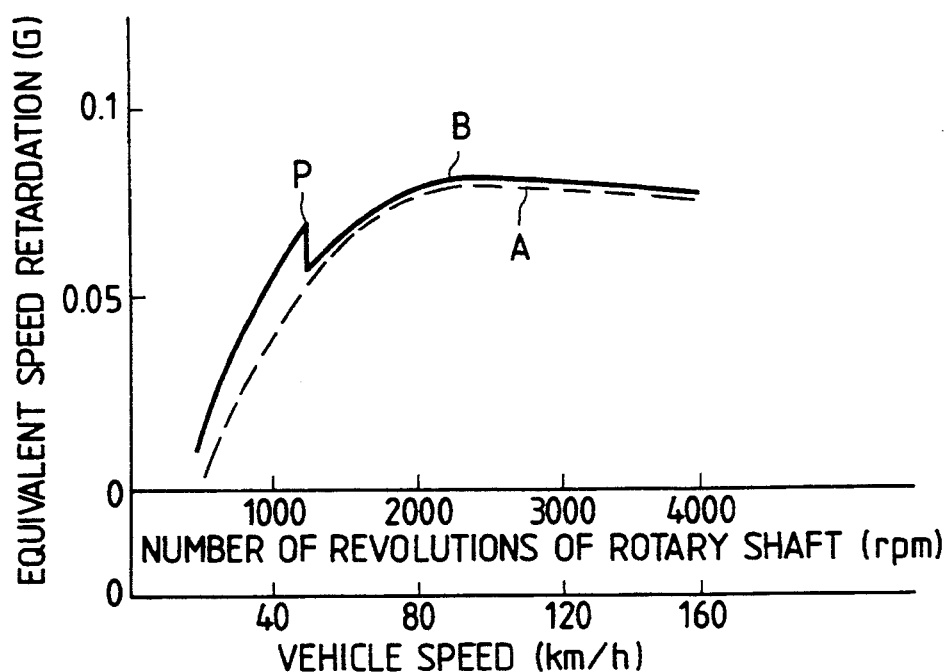
FIG. 3 is a graphical representation of the equivalent retardation—the number of revolutions or vehicle's speed characteristic of the first embodiment.

In FIGS. 1 to 3, there is shown a first embodiment of hydraulic retarder control system according to the invention. The hydraulic retarder system, as shown in FIG. 1, consists mainly of a hydraulic retarder 11, a hydraulic retarder unit 1 including a clutch device and an air pressure cylinder 17, a cooler/pump unit 2, a pressure control device 3, a clutch control device 6, a pressure air source 4, and a retarder switch 5. The hydraulic retarder 11 includes an unrotatable case 11c fixedly secured to a member (which is not shown in this figure) provided on the vehicle body side, such as a frame side member, a transmission rear cover or the like. A rotary shaft 10, one end portion of which is to be connected to a transmission output shaft or the like, extends through the central portion of the case 11c by means of suitable seal member and bearing in such a manner that the rotary shaft 10 is freely rotatable in a liquid tight manner. The other end portion of the rotary shaft 10 is connected through a propeller shaft or the like (not shown) to the wheel of the vehicle and is rotatable together with the vehicle wheel.

In this manner, in the periphery of the rotary shaft 10, there is defined a liquid-tight retarder chamber 12 which is defined by the case 11c and is always loaded and filled with operation liquid (oil or water). In the retarder chamber 12, there are provided a stator having radial vanes with the rotary shaft as the center thereof, and a fixable rotor 16 which is disposed opposed to the stator 15 and is unrotatable relatively with respect to members disposed at the rotary shaft 10 side. The stator 15 is integral with the case 11c and is fixed substantially unrotatable to a member disposed on the vehicle body side.

Also, the case 11c includes an operation liquid inlet 11a disposed at the central portion of the retarder chamber 12 and an operation liquid outlet 11b disposed in the outer peripheral portion of the retarder chamber 12.

Further, in the inner peripheral portion of the rotor 16, there is disposed a wet-type multiple disc clutch device 13 which is able to connect or disconnect a member provided at the rotary shaft 10 side with or from the rotor 16. The clutch device 13 includes a plurality of pressure plates 14 each formed in a circular ring, a cylindrical support member 19 which is fixed to the rotor 16 and is supported rotatably through a first bearing 13a to the case 11c and also which spline connects a proper one of the pressure plates 14 to thereby support it slidably in the central axis direction thereof, and a second bearing 13b for supporting a movable one of the pressure plates 14 situated in one end portion thereof in such a manner that the pressure plate can be freely rotated.

To the clutch device 13, there is attached an air pressure cylinder device 17 which serves as a drive device. The air pressure cylinder device 17 includes a pressure chamber 17c to be defined by a diaphragm 17a and a connecting member 17b which is used to connect the diaphragm 17a with the second bearing 13b.

On the other hand, a plurality of clutch plates 18 are spline connected with the rotary shaft 10 in such a manner that they are movable in the axial direction thereof, and are respectively disposed between the respective pressure plates 14.

In the above structure, if the pressure air from the pressure air source 4 is supplied to the pressure chamber 17c of the air pressure cylinder device 17 through a first switch valve 31 to be described later, then the movable pressure plate 14 situated in one end portion is pushed in through the diaphragm 17a, connecting member 17b and second bearing 13b to press the respective pressure plates 14 against the clutch plates 18 rotatable integrally with the rotary shaft 10, so that the clutch device 13 is connected. This rotates the cylindrical support member 19 which is rotatably supported to the case 11c through the first bearing 13a, the rotor 16 integral with the support member 19 is caused to rotate integrally with the rotary shaft 10. And, the kinetic energy of the liquid filled between the rotor 16 and stator 15 is converted into thermal energy to thereby produce a brake torque.

The clutch control device 6 has a first switch valve 31 and a pressure reducing valve 35. The first switch valve 31, which includes the pressure reducing valve 35, is interposed between the pressure air source 4 and the pressure chamber 17c of the air cylinder device 17, and has a b position to reduce the pressure of the pressure air source 4 through the pressure reducing valve 35 to the pressure chamber 17c and an a position to drain the pressure chamber 17c.

Also, the pressure control device 3 includes a second switch valve 32 and a third switch valve 95. The second switch valve 32 and third switch valve 95 include a first pressure reducing valve 33, a second pressure reducing valve 34 and a low speed pressure reducing valve 93 which are disposed upstream of and in parallel to the valves 32 and 95 and serve as reducing means, and are interposed between the pressure air source 4 and the air chamber 25d of the air/liquid conversion device 25 which will be described later. Thus, the second switch valve 32 and third switch valve 95 have a function as a switch valve to supply the pressure air of the pressure air source 4 to the air chamber 25d through one of the first and second pressure reducing valves 33, 34 and low speed pressure reducing valve 93. For this reason, the second switch valve 32 has a low pressure position d and an intermediate pressure and high pressure position c, while the third switch valve 95 has an intermediate pressure position e and a high pressure position f. The second switch valve 32 and air chamber 25d are connected with each other by a pipe arrangement 36. And, the second pressure reducing valve 34 and low speed pressure reducing valve 93 are connected to one inlet port of the second switch valve 32 through the third switch valve 95.

The first and second pressure reducing valves 33, 34 and low speed pressure reducing valve 93 are given set pressure respectively having different intensities, respectively. For this reason, according to the low pressure position d at the normal condition of the second switch valve 32, the pressure of the pressure air of the pressure air source 4 is reduced and adjusted by the first pressure reducing valve 33 down to a relatively lower set pressure (for example, 0.5 kgf/cm$^2$) and is then supplied to the air chamber 25d of the air/liquid conversion device 25. Also, by allowing the second switch valve 32 to take the intermediate pressure and high pressure position c and the third switch valve 33 to take its normal condition or the intermediate pressure position e, the pressure air of the pressure air source 4 is reduced to an intermediate pressure (for example, 1.0 kgf/cm$^2$) by the second pressure reducing valve 34 and is then guided into the air chamber 25d of the air/liquid conversion device 25. At the same time, by allowing the second switch valve 32 to take the intermediate pressure and high pressure position c and the third switch valve 95 to take the high pressure position f, the pressure air of the pressure air source 4 is controlled to a high pressure (for example, 2.0 kgf/cm$^2$) by the low speed pressure reducing valve 93 and is then guided into the air chamber 25d of the air/liquid conversion device 25.

In this manner, the three pressure reducing valves 33, 34, and 93, which are included in the second switch valve 32 and third switch valve 95, serve as a pressure reducing valve which is able to switch the pressure of the air to be supplied from the pressure air source 4 to the air chamber 25d of the air/liquid conversion device 25 over to the low pressure, intermediate pressure and high pressure. Also, the pressure reducing valves 33, 34 and the low speed pressure reducing valve 93 are respectively capable of relieving the pressure at the secondary side, that is, at the side of the air chamber 25d of the air/liquid conversion device 25.

The above-mentioned first switch valve 31, second switch valve 32 and third switch valve 95 are respectively connected to a retarder switch 5 and one of the three valves 31, 32 and 95 can be selectively switched and connected by a control circuit which will be described later.

On the other hand, the operation liquid inlet 11a provided in the case 11c is connected through the closed circuit 21 and cooler/pump unit 2 to the operation liquid outlet 11b formed in the case 11c. That is, to the closed circuit 21, there are connected a pump 22 and an operation liquid cooler 23 which are used to circulate the operation liquid sequentially from the side of the operation liquid inlet 11a. The pump 22 is rotationally driven by an electric motor 22a, while the operation liquid cooler 23 is air cooled by a fan 23a.

Also, to the proper portion (in the illustrated embodiment, one end portion of the operation liquid cooler 23) of the closed circuit 21, there is connected through a pipe arrangement 28 an air/liquid conversion device 25 which is used to apply air to the operation liquid of the closed circuit 21 and thus the operation liquid of the hydraulic retarder 11. The air/liquid conversion device 25 include the operation liquid chamber 25c for storing the operation liquid and the air chamber 25d formed by dividing the main body 25a of the air/liquid conversion device 25 by means of a rubber film 25b which is a flexible film having an airtight property and easy to deform. The operation liquid chamber 25c is always connected to the closed circuit 21 and also the air chamber 25d is connected to the pressure air source 4 through one of the three pressure reducing valves 33, 34, 93 respectively arranged in parallel upstream of the above-mentioned second switch valve 32 or third switch valve 95 and these two switch valves 32, 95, so that the pressure air having a given pressure is supplied to the air chamber 25d. This makes it possible to control the pressure of the operation liquid of the closed circuit 21 and thus the operation liquid of the hydraulic retarder 11 to a high or low pressure level. The operation liquid chamber 25c serves also as a reservoir for the operation liquid.

Also, to the operation liquid chamber 25c, there is connected an operation liquid reservoir 27 through a manual switch valve 26 and thus the operation liquid of the operation liquid reservoir 27 can be supplied to the operation liquid chamber 25c of the air/liquid conversion device 25 by manually operating or switching the manual switch valve 26.

According to the illustrated embodiment, there are provided first and second liquid temperature detect means 41 and 42; the first liquid temperature detect means consists of a switch which is disposed in the outer peripheral side half section of the hydraulic retarder 11 and is used to detect a relatively high temperature (for example, 150° C.), that is, a first given temperature of the operation liquid; and, the second liquid temperature detect means consists of a switch which is disposed in the operation liquid cooler 23 and is used to detect a second given temperature of the operation liquid, which is slightly (on the order of 10° to 20° C.) lower than the detected temperature by the first liquid temperature detect means 41. The reason why the first liquid temperature detect means 41 is disposed in the outer peripheral side half section of the hydraulic retarder 11 is that the inner peripheral side half section of the hydraulic retarder 11 when it is stirred by the rotor 16 is easy to produce cavitation which makes it possible to grasp accurately the temperature of the operation liquid while stirred. Also, the reason why the detect temperature by the second liquid temperature detect means 42 is set slightly (on the order of 10° to 20°) lower than the detect temperature by the first liquid temperature 41 is to take into consideration the drop of the temperature of the operation liquid during the period of time while it flows out from the operation liquid outlet 11b of the retarder chamber 12, circulates through the closed circuit 21 and flows into the operation liquid cooler 23. The above-mentioned first given temperature (for example, 150° C.) is set slightly lower than an actual temperature to produce overheat, in order to be able to detect even an instantaneous rise in temperature.

The first liquid temperature detect means 41 or second liquid temperature detect means 42, when one of them detects the fact that the operation liquid rises in temperature up to either of the above-mentioned first and second given temperatures, drains and thus returns the air pressure cylinder device 17 to thereby disconnect the clutch device 13. The return driving of the air pressure cylinder 17 is, actually, carried out by disconnecting the switch 43 to switch the first switch valve 31 into its a position and then by returning the diaphragm 17a and connecting member 17b by use of a spring (not shown).

Also, there is provided third liquid temperature detect means 44 consisting of a switch which is used to detect the intermediate temperature, that is, a third given temperature (for example, 120° C.) of the operation liquid. The third liquid temperature detect means 44 is normally disposed in the hydraulic retarder 11 and, however, alternatively, it can be disposed in the closed circuit 21 such as the operation liquid cooler 23 or the like. When it detects that the operation liquid rises in temperature up to the third given temperature, the third liquid temperature detect means 44 allows the second switch valve to take its low pressure position d to thereby switch the pressure to be supplied to the air/liquid conversion device 25 into the low pressure side. In fact, the third liquid temperature detect means 44 disconnects the switch 45 to thereby allow the second switch valve 32 to take its low pressure position d and also to thereby prohibit the valve 32 to be switched to its intermediate and high pressure position c.

Further, there is provided fourth liquid temperature detect means 46 which is used to detect a relatively low, fourth given temperature (for example, 80° C.) of the operation liquid. The fourth liquid temperature detect means 46 is normally disposed in the operation liquid cooler 23 and, however, alternatively, it can be disposed in the hydraulic retarder 11 or in the closed circuit 21.

The above-mentioned first to fourth liquid temperature detect means 41, 42, 44 and 46 are incorporated in a control circuit shown in FIG. 2. At first, in FIG. 2, there is provided a power supply 50 to which are connected in series an exhaust brake switch 51 used to operate an exhaust brake 54, an accelerator switch 52 closed when an accelerator pedal is not pressed down, a clutch switch 57 closed when a clutch pedal for cutting or transmitting a running drive force is nor engaged, an anti-lock switch 53 closed when an anti-lock brake system is not in operation, and the exhaust brake 54. And, to the power supply 50, there are further connected a pressure switch 55 closable when the pressure of the pressure air source is reduced, and an alarm lamp 56 which gives an alarm when the pressure reduction occurs.

The retarder switch 5 is connected between the exhaust brake switch 51 and accelerator switch 52 and has three switching positions, that is, (1) position, (2) position and (3) position. The (1) position is a hydraulic retarder 11 off position in which the exhaust brake switch 51 is closed to thereby operate only the exhaust brake 54. The (2) position is a low pressure position which allows the second switch valve 32 to take the low pressure position d to thereby apply a relatively low pressure through the first pressure reducing valve 33 to the air chamber 25d of the air/liquid conversion device 25. And, the (3) position is an intermediate and high pressure position which allows the second switch valve 32 to take the intermediate and high pressure position c to thereby apply an intermediate or a high pressure to the air chamber 25d of the air/liquid conversion device 25 through the second o pressure reducing valve 34 or low speed pressure reducing valve 93 and the third switch valve 95. Also, at the (2) and (3) positions, the clutch device 13 is connected and driven by the air pressure cylinder device 17. Thus, the (2) and (3) positions form the on position of the hydraulic retarder 11.

A first AND circuit 60 has four input terminals to which there are connected a signal showing that the retarder switch 5 is in the (2) or (3) position through a circuit 75, a signal showing that the exhaust brake switch 51, accelerator switch 52, clutch switch 57 and anti-lock switch 53 are respectively closed through a circuit 76, a signal showing that the pressure switch 55 is open through a circuit 77 including a NOT circuit 61 invertedly, and a signal given when at least one of the first liquid temperature detect means 41 or second liquid temperature detect means 42 detects the given temperature through a circuit 78 including a NOT circuit 62 invertedly, respectively. For this reason, a pair of first liquid temperature detect means 41 and second liquid temperature detect means 42 are respectively connected to the input terminals of an OR circuit 64, while the output terminal of the OR circuit 64 is connected to the circuit 78. The output terminal of the first AND circuit 60 is connected through a circuit 84 to a switch 43 and, responsive to an output signal from the first AND circuit 84, the switch 43 is closed. The closed operation of the switch 43 makes sure to allow the retarder switch 5 to operate the first switch valve 31 and, if the switch 43 is opened, then the first switch valve 31 is switched into the a position regardless of the switch position of the retarder switch 5.

When at least one of the first liquid temperature detect means 41 or second liquid temperature detect means 42 detects the first or second given temperature, then a buzzer 65 will give an alarm sound. Also, when the exhaust brake switch 51, accelerator switch 52, clutch switch 57 and anti-lock switch 53 are all closed, then a lamp 66 such as a pilot lamp, a brake lamp or the like will light up to thereby indicate that the exhaust brake 54 or the hydraulic retarder 11 is in operation.

A second AND circuit has three input terminals to which there are connected a signal showing that the retarder switch 5 is in the (3) position through a circuit 79, the output signal of the first AND circuit 60 through a circuit 80, and a detect signal of the third liquid temperature detect means 44 through a circuit 81 including a NOT circuit 69 invertedly, respectively. The output terminal of the secondhand circuit 68 is connected through a circuit 85 to the switch 45 and, responsive to an output signal from the second AND circuit 68, the switch 45 is closed.

The closing operation of the switch 45 makes sure to allow the retarder 5 to operate the second switch valve 32. And, if the switch 45 is opened, the second switch valve 32 is allowed to take the low pressure position d regardless of the switch position of the retarder switch 5, so that the pressure air having a relatively low pressure only from the first pressure valve 33 can be supplied to the air chamber 25d of the air/liquid conversion device 25. Also, if a detect signal is generated by the third liquid temperature detect means 44, then an alarm lamp 70 such as a yellow lamp or the like will light up.

Further, a third AND circuit 99 has two input terminals to which are connected the output terminal of the second AND circuit 68 through a circuit 98 and a detect signal given by running speed detect means 100 through a circuit 101. The running speed detect means 100 consists of a vehicle speed detect switch to be connected to the power supply 50, turns off when the running speed of the vehicle exceeds a given running speed, and turns on when the vehicle running speed is equal to or slower than the given running speed (for example, the vehicle running speed of 50 km/h or less), outputting a detect signal. The third AND circuit 99 has an output terminal which is connected through a circuit 91 to the third switch valve 95 and also which, when there is given an output signal from the third AND circuit 99, switches the third switch valve 95 into the high pressure position f to put the third switch valve 95 into a high pressure condition, and thus supplies the high pressure air from the pressure air source 4 to the air chamber 25d of the air/liquid conversion device 25 through the low speed pressure reducing valve 93 and second switch valve 32.

Also, if there is given a detect signal by fourth liquid temperature detect means 46, then the electric motor 22a and fan 23a are driven by means of a circuit 82, so that the operation liquid in the closed circuit 21, hydraulic retarder 11 and the like can be circulated by means of the pump 22 and also the operation liquid cooler 23 can be operated.

Next, description will be given below of the operation of the above-mentioned embodiment of the invention.

At first, while the vehicle is running, if the exhaust brake switch is closed, then the accelerator pedal is not pressed down but the accelerator switch 52 is closed, the clutch pedal is not depressed but the clutch switch 57 is closed, and, while the anti-lock brake system is not in operation and the anti-lock switch 53 is closed, the exhaust brake 54 begins to operate. Now, in the following description, it is assumed that the vehicle runs in its normal retarding condition due to the exhaust brake 54, the exhaust brake switch 51, accelerator switch 52, clutch switch 57 and anti-lock switch 53 are all closed, and the pressure switch 55 is opened.

Next, if the retarder switch 5 is switched over, for example, to the (2) position, then the pressure air from the pressure air source 4 is guided through the first switch valve 31 to the pressure chamber 17c of the air pressure cylinder device 17, and the clutch device is connected. That is, if the first switch valve 31 is allowed to take the b position and the pressure air from the pressure air source 4 is guided in to the pressure chamber 17c, then the connecting member 17b is pushed in through the diaphragm 17a to thereby press the pressure plate 14, which is supported by the second bearing 13b, against the clutch plate 18 rotatable integrally with the rotary shaft 10, so that the clutch device 13 can be connected.

This rotates the support member 19 supported rotatably to the case 11c by means of the first bearing 13 or the like, so that the rotor 16 integral with the support member 19 begins to rotate integrally with the rotary shaft 10. In this operation, the second switch valve 32 is allowed to take the low pressure position d, the pressure air of the pressure air source 4 is reduced and controlled in pressure to a relatively low set pressure by the first pressure reducing valve 33 and is then supplied to the air chamber 25d of the air/liquid conversion device 25, and there is generated in the hydraulic retarder 11 a relatively small brake torque corresponding to a relatively low set pressure. That is, due to the self-pumping operation of the rotor 16, in such a circulation condition that the operation liquid serving also as a coolant flows in from the operation liquid inlet 11a and flows out from the operation liquid outlet 11b, the operation liquid, which is given kinetic energy as it is stirred by the rotor 16, collides with the stator 15 and thus the kinetic energy of the operation liquid is transmitted as thermal energy to the stator 15, thereby providing a brake action. At the same time, the operation liquid also cools the clutch device 13.

Next, if the retarder switch 5 is switched over to the (3) position, then the switch 45 is closed responsive to a signal from the second AND circuit 68, with the result that the second switch valve 32 is switched over to the intermediate and high pressure position c while the clutch device 13 remains connected. In this operation, if the running speed of the vehicle exceeds the given running speed and thus the running speed detect means 100 is in the off operation, then the pressure of the pressure air of the pressure air source 4 is reduced and controlled by the second pressure reducing valve 34 to the intermediate set pressure and is then supplied to the air chamber 25d of the air/liquid conversion device 25, so that there is generated in the hydraulic retarder 11 a slightly large brake torque corresponding to the intermediate set pressure.

When the vehicle is reducing its speed in this manner, or if the running speed detect means 100 is on when the retarder switch 5 is switched over to the (3) position, the third switch valve 95 is switched from the intermediate pressure position over to the high pressure position f in accordance with the detect signal of the running speed detect means 100. However, it is assumed that it is not detected by the third liquid temperature detect means 44 that the operation liquid has risen up to the third given temperature.

If the third switch valve 95 takes the high pressure position f, as the second switch calve 32 takes the intermediate and high pressure position, then the pressure air having a high pressure is supplied through the low speed pressure reducing valve 93 to the air chamber 25d of the air/liquid conversion device 25. As a result of this, while the vehicle is running at running speeds equal to or slower than the given running speed, the pressure air having a pressure higher than the set pressure at running speeds exceeding the given running speed is supplied to the air chamber 25d, so that there is generated in the hydraulic retarder 11 a further larger brake torque corresponding to the high pressure air. This can make up for the shortage of the brake torque of the hydraulic retarder 11 at the running speeds equal to or slower than the given running speed, thereby providing a proper speed reduction.

Now, description will be given below of the speed retardation of the vehicle obtained when the retarder switch 5 is set at the (3) position with reference to FIG. 3. A broken line A shows the characteristic of an equivalent speed retardation (G) generated in a state where the retarder switch 5 is switched over to the (3) position, in a conventional hydraulic retarder which does include the low speed pressure reducing valve 93 and third switch valve 95. And, a real line B shows the characteristic of an equivalent speed retardation generated in the hydraulic retarder 11 according to the present embodiment in a state where the retarder switch 5 is switched over to the (3) position. As the equivalent speed retardation of the vehicle generated by the operation of the hydraulic retarder 11, as shown by the broken line A, in the high speed running (when the number of revolutions of the rotary shaft 10 is equal to or more than about 2,000 rpm (the vehicle speed of 80 km/h or more)), about 0.08 G can be obtained stably, and as the speed is reduced, the vehicle equivalent speed retardation due to the operation of the hydraulic retarder is also gradually decreased.

On the other hand, if the vehicle slows down to a given running speed (the number of revolutions of the rotary shaft 10 is of the order of 1,250 rpm (the vehicle speed of 50 km/h)), then the third switch valve 95 takes the high pressure position f and the pressure air of a high pressure is supplied through the low speed pressure reducing valve 93 to the air chamber 25d, so that the equivalent speed retardation (G) can be increased instantaneously, as shown by a point P. After then, the pressure air of a high pressure from the low speed pressure reducing valve 93 is supplied on to the air chamber 25d, with the result that there can be obtained a relatively high equivalent speed retardation (G).

And, during the operation of the hydraulic retarder 11, if the operation liquid rises up to a fourth temperature which is a relatively low temperature (for example, 80° C.), then this is detected by the fourth liquid temperature detect means 46 and thus the pump 22 is driven rotationally by the electric motor 22a and also the operation liquid cooler 23 is air cooled by the fan 23a.

Also, if the operation liquid rises in temperature and the intermediate temperature or the third given temperature (for example, 120° C.) of the operation liquid is detected by the third liquid temperature detect means 44, then the detect signal is inverted and supplied through the NOT circuit 69 to the second AND circuit 68 and at the same time the alarm lamp 70 turns on. And, while the signals from the both circuits 79 and 80 are being respectively input to the second AND circuit 68, the switch is caused to open. As a result of this, although the retarder switch 5 is switched to the (3) position, the second switch valve 32 is allowed to take the low pressure position d so that the pressure air of a relatively low pressure only from the first pressure reducing valve 33 is supplied to the air chamber 25d of the air/liquid conversion device 25. Of course, even when the running speed detect means 100 is on, since the second switch valve 32 takes the low pressure position d, there is no possibility that the pressure air of a high pressure can be supplied to the air chamber 25d of the air/liquid conversion device 25.

Further, if the operation liquid rises in temperature and the relatively high temperature, that is, the first or second given temperature (for example, of the order of 130° to 150° C.) of the operation liquid is detected by one of the first and second liquid temperature detect means 41 and 42, then the detect signal is input through the OR circuit 64 and NOT circuit 62 into the first AND circuit 60 and, at the same time, the buzzer 65 issues an alarm sound. For this reason, even when a signal to allow the retarder switch 5 to take the (2) or (3) position is input to the other input terminal of the first AND circuit 60, the switch 43 is cut and thus the first switch valve 31 is switched over to the a position, whereby the pressure chamber 17c of the air pressure cylinder device 17 is drained and the diaphragm 17a and connecting member 17b are caused to return by a spring (not shown), so that the clutch device 13 is disconnected. Of course, when the signal from the circuit 80 is not input to the second AND circuit 68, there does not exist an output signal from the third AND circuit 99, which eliminates the possibility that the third switch valve 95 can take the high pressure position f.

In this, manner, although the retarder switch 5 takes the (2) or (3) position, the operation of the hydraulic retarder 11 is stopped and, therefore, there can be prevented inconveniences, especially a fire caused by the overheated hydraulic retarder 11. Accordingly, due to the fact that the relatively high temperature, that is, the first or second given temperature of the operation liquid is detected by either of the first or second liquid temperature detect means 41 or 42 in consideration of a temperature drop caused by the movement of the operation liquid, as well as due to the fact that the first liquid temperature detect means 41 is disposed in the outer peripheral side half section of the hydraulic retarder 11 to thereby be able to detect the temperature of the operation liquid within the hydraulic retarder 11 being stirred by the rotor 16 with relative accuracy, there can be detected accurately a possibility of overheating of the hydraulic retarder 11.

Of course, if the retarder switch 5 is switched over to the (1) position and is thus turned off, then the clutch device 13 is disconnected, so that the rotation of the rotor 16 is caused to stop and at the same time the second switch valve 32 in the intermediate pressure and high pressure position c is caused to return back to the low pressure position d.

In the above-mentioned embodiment, in a running state in which the second switch valve 32 takes the intermediate pressure and high pressure position c, when there is given a detect signal by the running speed detect means 100, then the third switch valve 95 is switched over to the high pressure position f. However, this is not limitative but, alternatively, other switching method is possible. That is, in a running state in which the second switch valve 32 takes the low pressure position d, when there is given a detect signal by the running speed detect means 100, then the second switch valve 32 is allowed to take the intermediate pressure and high pressure position c and also the third switch valve 95 is switched over to the high pressure position f to thereby switch the operation position from the operation position of the first pressure reducing valve 33 over to the operation position of the low speed pressure reducing valve 93, so that the high pressure air can be given to the air chamber 25d of the air/liquid conversion device 25.

Figure 5:
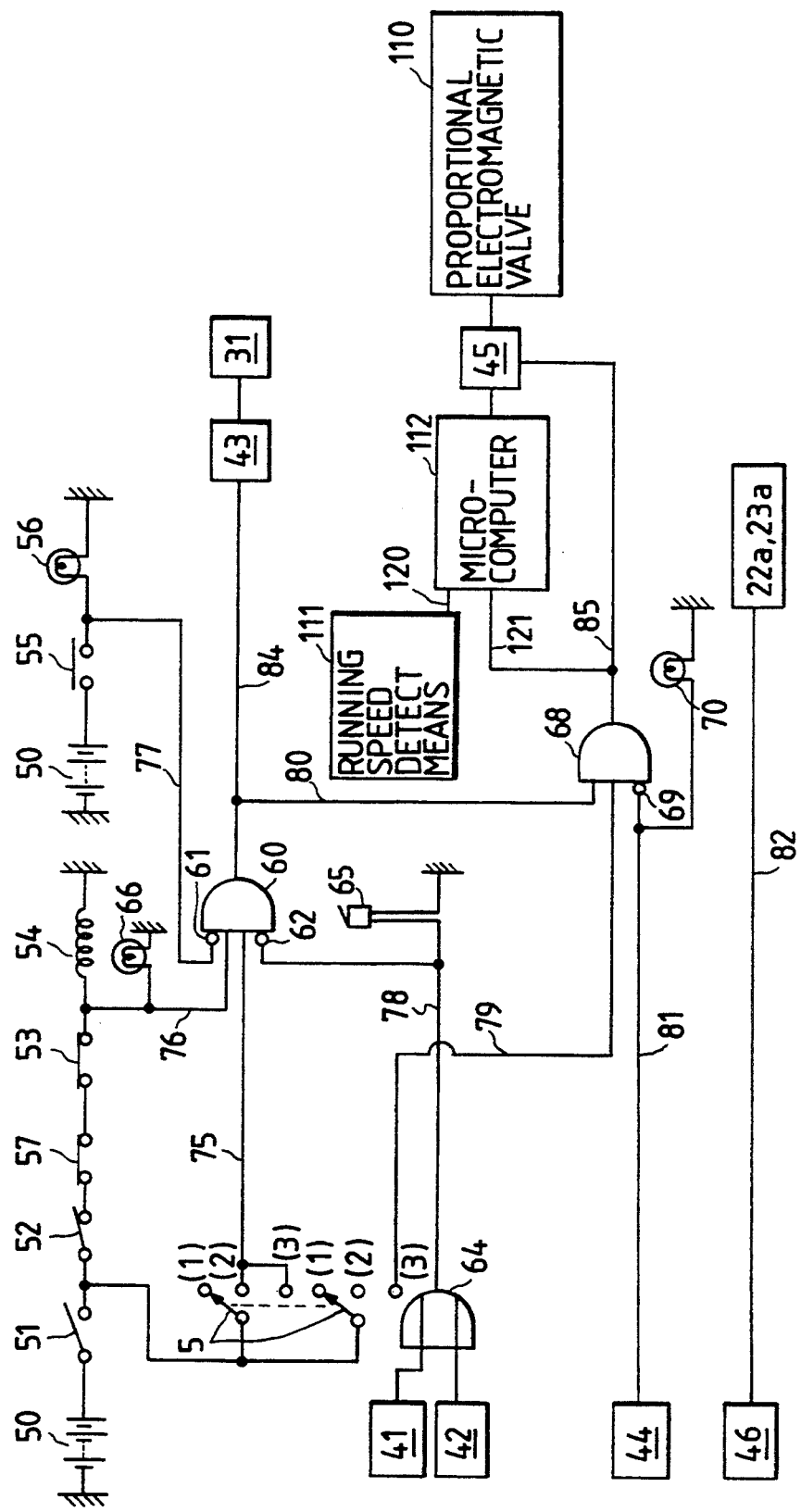
FIG. 5 is a circuit diagram of the second embodiment.
Figure 6:
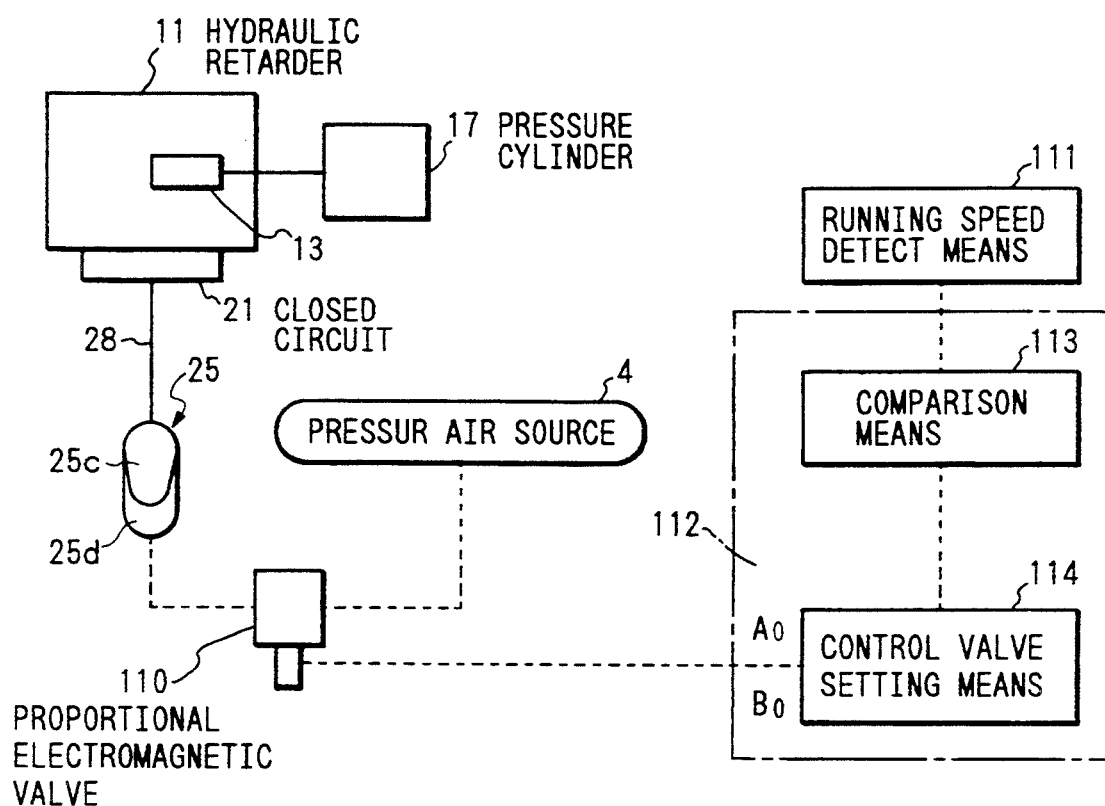
FIG. 6 is a block diagram of the components of the second embodiment.

Referring now to FIGS. 4 to 8, there is shown a second embodiment of a hydraulic retarder control system according to the invention. In the second embodiment, parts which are essentially the same as those in the first embodiment are respectively given the same reference characters and the description thereof is omitted here. In the second embodiment, in place of the first pressure reducing valve 33, second pressure reducing valve 34 and low speed pressure reducing valve 93 as well as the second switch valve 32 and third switch valve 95 respectively used in the first embodiment, there is arranged a proportional electromagnetic valve 110 which serves as pressure reducing means. Also, as shown in FIG. 5, there is employed a running speed detect sensor as running speed detect means 111 which detects running speeds equal to or lower than a given running speed of a vehicle, and a detect signal output by the running speed detect means 111 and the output terminal of a second AND circuit 68 are respectively connected through circuits 120 and 121 to a microcomputer 112.

Due to the connection of the output terminal of the second AND circuit 68 to the microcomputer 112, the hydraulic retarder 11 can be operated by a first AND circuit 60 and a retarder switch 5 is switched over to the (3) position and, when it is not detected that the operation liquid has risen to the above-mentioned third given temperature, the proportional electromagnetic valve 110 is controlled by the microcomputer 12. In the second embodiment, a switch 45 is interposed between the microcomputer 112 and proportional electromagnetic valve 110 and, when the intermediate or third given temperature (for example, 120° C.) of the operation liquid is detected by the third liquid temperature detect means 44 consisting of a switch, the switch 45 is disconnected to thereby cut off a signal to the proportional electromagnetic valve 110, whereby the proportional electromagnetic valve 110 is allowed to have a low pressure condition similar to a case in which the second switch valve 32 takes the low pressure position d in the first embodiment.

The microcomputer 112 has a function serving as control value setting means 114 which sets a control value $A_0$ and an intermediate pressure control value $B_0$ corresponding to detect signals output by comparison means 113 and running speed detect means 111. That is, the detect signal given by the running speed detect means 111 is compared in the comparison means 113 and, when it is found that the vehicle is running at speeds exceeding a given running speed, then the proportional electromagnetic valve 110 is controlled on the basis of the above-mentioned intermediate pressure control value $B_0$ to thereby provide an intermediate pressure air as the air to be supplied to the air chamber 25d of the air/liquid conversion device 25. On the other hand, when the vehicle runs at speeds equal to or slower than the given running speed and there exists an output signal from the second AND circuit 68, then the proportional electromagnetic valve 110 is controlled on the basis of the control value $A_0$ to thereby vary or increase gradually the pressure of the air to be supplied to the air chamber 25d of the air/liquid conversion device 25 as the running speeds slow down. The control value $A_0$ as well as intermediate pressure control value $B_0$ are previously stored in a ROM within the microcomputer 112 as a data table corresponding to the running speeds, and the pressure of the air to be supplied to the air chamber 25d of the air/liquid conversion device 25 on the basis of the control $A_0$ is set higher than that of the air to be supplied to the air chamber 25d of the air/liquid conversion device 25 on the basis of the intermediate pressure control value $B_0$.

Now, description will be given below of the operation of the second embodiment with reference to a flow chart shown in FIG. 7. In Step P1, it is checked whether there is present or not an input signal from the second AND circuit 68 to the microcomputer 112. If not, then the processing returns without performing any operation. If present, then in Step P2 a detect signal is read in which is a speed signal given by the running speed detect means 111, and the processing advances to Step P3. In Step P3, it is checked by the comparison means 113 whether the vehicle runs at speeds equal to or slower than the given running speed. If it is found that the vehicle runs at speeds exceeding the given running speed, then in Step P4 the intermediate pressure control value $B_0$ is read in, in Step P5 the intermediate pressure control value $B_0$ is output, and the proportional electromagnetic valve 110 is controlled on the basis of the intermediate pressure control value $B_0$, so that the pressure of the air to be supplied to the air chamber 25d of the air/liquid conversion device 25 is set as an intermediate pressure. As a result of this, similarly to a case in which the second switch valve 32 is switched over to the intermediate pressure and high pressure position c to thereby operate the second pressure reducing valve 34 in the first embodiment, the pressure of the pressure air in the pressure air source 4 is controlled and reduced down to an intermediate set pressure is then supplied to the air chamber 25d of the air/liquid conversion device 25, so that there is generated in the hydraulic retarder 11 a slightly large brake torque corresponding to the intermediate set value.

On the other hand, if it is found that the vehicle runs at the speeds slower than the given speed, then the processing goes to Step P6 where the data table is looked up and a control value $A_0$ corresponding to the vehicle's running speed is read in. Next, in Step P7, the control value $A_0$ is output, the degree of opening of the proportional electromagnetic valve 110 is controlled in accordance with the control value $A_0$, and the air of a given pressure is supplied to the air chamber 25d of the air/liquid conversion device 25. Such control is repeated every given time. Thus, by use of the pressure air on the basis of the control values $A_0$ read in successively according to the speed signals, the pressures of the operation liquid of the hydraulic retarder 11 are controlled successively and a given retardation is generated while it is varying.

Figure 8:
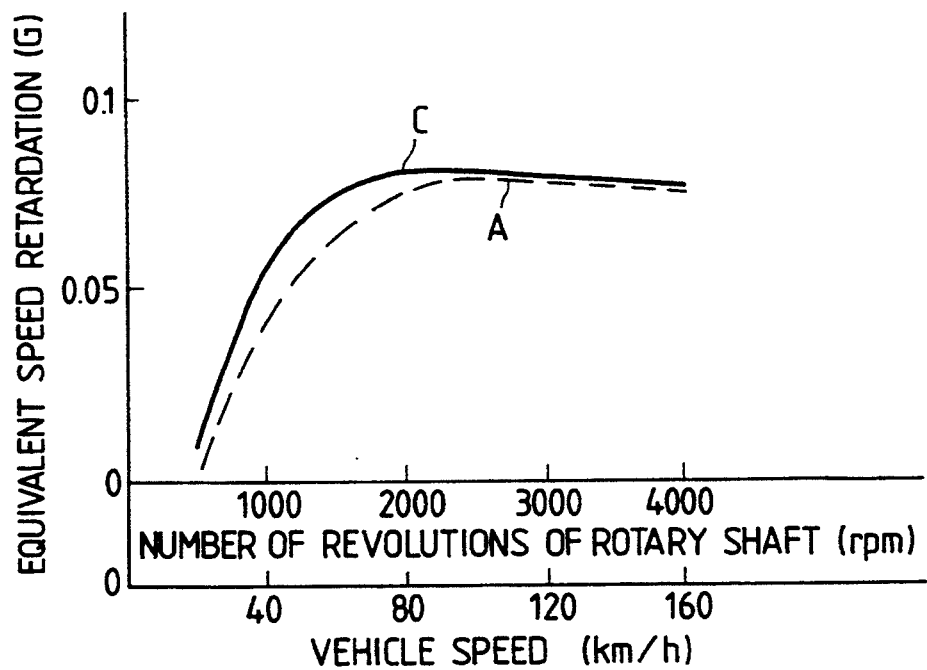
FIG. 8 is a graphical representation of the equivalent retardation—the number of revolutions or vehicle's speed characteristic of the second embodiment.
Figure 4:
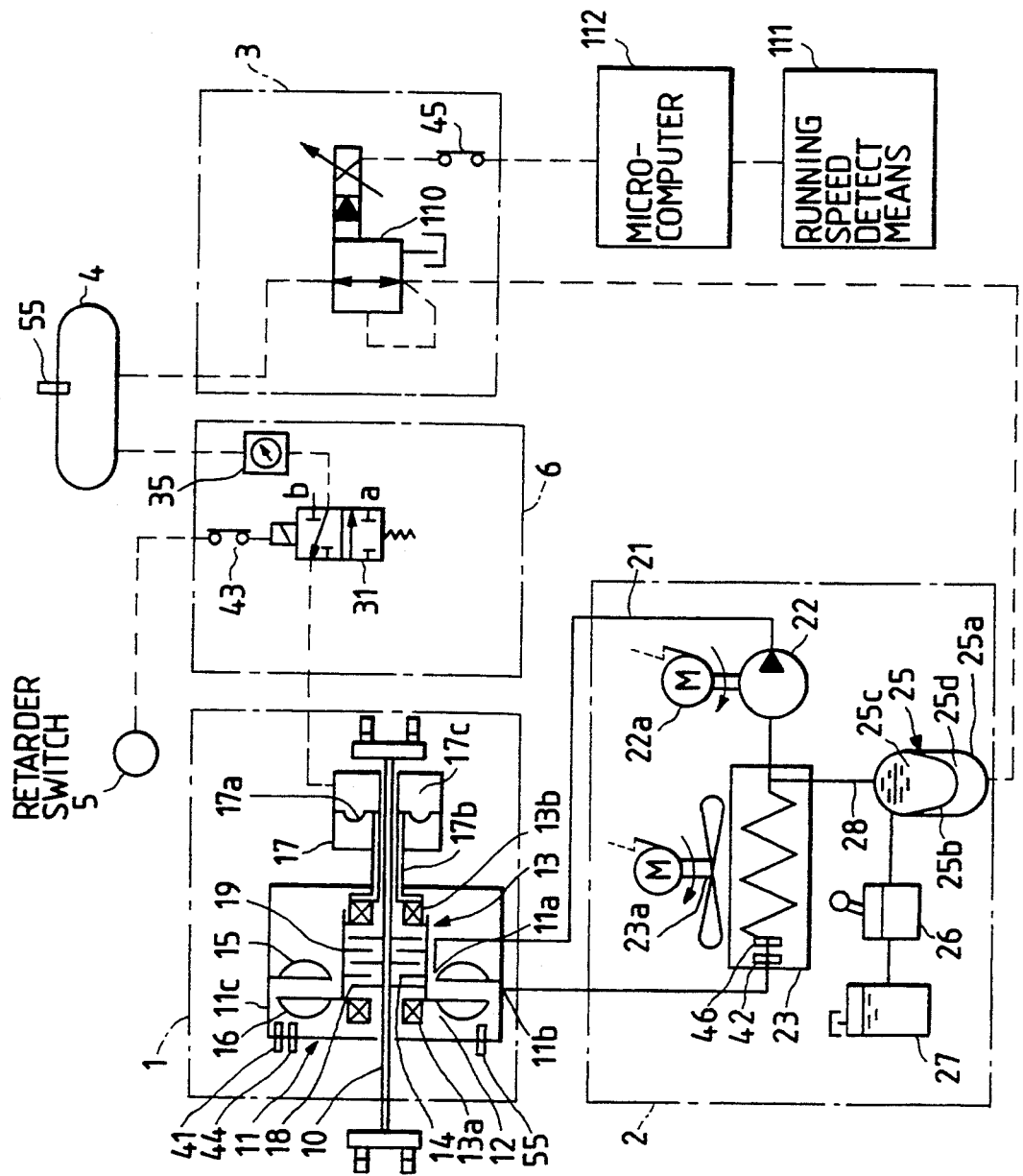
FIG. 4 is a schematic view of a second embodiment of a hydraulic retarder control system according to the invention.

Description will be given below of the vehicle's retardation obtained when the retarder switch 5 takes the (3) position with reference to FIG. 8. A broken line A shows the characteristic of an equivalent retardation (G) which occurs in the conventional hydraulic retarder as mentioned previously, and a heavy line C shows the characteristic of an equivalent retardation which occurs in a hydraulic retarder 11 according to the present embodiment.

In other wards, when the running speed of the vehicle exceeds the given running speed (the number of revolutions of the rotary shaft 10 is of the order of 2,250 rpm (that is, the vehicle's speed of 90 km/h)), the proportional electromagnetic valve 110 is controlled on the basis of the intermediate control value $B_0$ and there is generated in the hydraulic retarder 11 a slightly large brake torque which corresponds to an intermediate set pressure. On the other hand, when the vehicle slows down to the given running speed (the number of revolutions of the rotary shaft 10 is of the order of 2,250 rpm (that is, the vehicle's speed of 90 km/h)), then the pressure air, the pressure of which is gradually increased on the basis of the control values $A_0$ varying according to the decreases in the running speed, is supplied to the air chamber 25d of the air/liquid conversion device 25, thereby restricting the lowering tendency of the equivalent retardation (G) which occurs in the hydraulic retarder 11. The variations of the equivalent retardation (G) can be given successively and it is not necessary to produce such a sudden increase in the equivalent retardation as shown by a point P in FIG. 3, so that a good operation feeling can be provided.

In the second embodiment, there is provided the comparison means 113 and it is checked by the comparison means 113 whether the vehicle's speed is equal to or slower than the given running speed. Alternatively, if there is attached to the running speed detect means 111 a switch which turns on when the vehicle's speed is equal to or slower than the given running speed, the comparison means 113 can be omitted. Also, in the second embodiment, the pressure of the operation liquid of the hydraulic retarder 11 is controlled on the basis of the control values $A_0$ corresponding to the running speeds of the vehicle equal to or slower than the given running speed. Alternatively, similarly to the first embodiment, if the pressure of the operation liquid of the hydraulic retarder 11 is controlled to be somewhat higher on the basis of a constant control value which does not vary under the condition of the given running speed, then there can be obtained a retardation characteristic similar to that shown in FIG. 3. Further, with respect to the retardation of the vehicle obtained when the retarder switch 5 takes the 42) position, when it is detected by the running speed detect means 111 that the running speed of the vehicle is equal to or slower than the given running speed, if the proportional electromagnetic valve 110 is controlled on the basis of the control value, then the pressure of the pressure air to be supplied to the air/liquid conversion device 25 can be gradually increased as the running speed of the vehicle slows down.

As can be understood from the foregoing description, in a hydraulic retarder control system according to the invention, without changing the basic structure of a hydraulic retarder device but by use of a simple structure, there can be made up for a retardation in a low speed running condition in which a brake torque by a hydraulic retarder is caused to decrease and there can be obtained continuously a good retarding tendency, so that the feeling of operation of the vehicle can be improved as well as rear-end collisions can be prevented.

What is claimed is:

1. A hydraulic retarder control system, comprising:
    a hydraulic retarder mounted on a rotary shaft rotatable together with a vehicle wheel comprising a rotor and an unrotatable stator, said hydraulic retarder being always filled with operation liquid;
    a clutch device drivable by a drive device for connecting or disconnecting said rotor with or from said rotary shaft;
    a closed circuit for connecting the operation liquid inlet and outlet of said hydraulic retarder;
    an air/liquid conversion device for applying an air pressure to said operation liquid present in said closed circuit;
    pressure reducing means capable of switching the pressure of the air to be supplied from a pressure air source to said air/liquid conversion device; and
    running speed detect means for detecting the fact that the running speed of a vehicle is equal to or slower than a given running speed,
    wherein, when there is given a detect signal by said running speed detect means, then the pressure of said pressure reducing means is switched into a higher pressure condition than a set pressure at running speeds exceeding said given running speed, so that a high pressure air from said pressure air source can be supplied to said air/liquid conversion device.

2. A hydraulic retarder control system as set forth in claim 1, wherein said pressure reducing means comprises a first pressure reducing valve for reducing the pressure of the air to be supplied from said pressure air source to said air/liquid conversion device to a low pressure, a second pressure reducing valve for reducing the pressure of said air to an intermediate pressure, a low speed pressure reducing valve for reducing the pressure of said air to a high pressure, and switch valves each having a low pressure position, an intermediate pressure position or a high pressure position for switching the pressure of said air to be supplied to said air/liquid conversion device through said first and second and low speed pressure reducing valves, whereby, when there is given a detect signal by said running speed detect means while said switch valves are allowed to take said intermediate position, said pressure reducing means allows said switch valves to take said high pressure position, so that said high pressure air from said pressure air source can be supplied to said air/liquid conversion device.

3. A hydraulic retarder control system as set forth in claim 1, wherein said pressure reducing means comprises a proportional electromagnetic valve capable of linearly reducing the pressure of said air to be supplied from said pressure air source to said air/liquid conversion device, whereby, when said running speed detect means detects a condition that the running speed of said vehicle is equal to or slower than said given running speed, then said proportional electromagnetic valve is controlled on the basis of a control value to be set in accordance with said detect signal of said running speed detect means to thereby increase gradually the pressure of said air to be supplied to said air/liquid conversion device as said running speed is lowered.

* * * * *